United States Patent
Baldwin (10) Patent No.: US 9,057,896 B1
(45) Date of Patent: Jun. 16, 2015

(54) ORIENTATION VARIABLE POLARIZATION

(71) Applicant: Amazon Technologies, Inc., Reno, NV (US)

(72) Inventor: Leo Benedict Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 145 days.

(21) Appl. No.: 13/721,841

(22) Filed: Dec. 20, 2012

(51) Int. Cl.
*H04N 5/238* (2006.01)
*G02F 1/13* (2006.01)
*H04N 5/225* (2006.01)
*H04N 5/232* (2006.01)
*H04N 5/235* (2006.01)

(52) U.S. Cl.
CPC .............. *G02F 1/1313* (2013.01); *H04N 5/238* (2013.01); *H04N 5/2254* (2013.01); *H04N 5/232* (2013.01); *H04N 5/235* (2013.01)

(58) Field of Classification Search
CPC ..... H04N 5/238; H04N 5/2254; H04N 5/232; H04N 5/23209; G02F 1/1337
USPC ......................................................... 348/360
See application file for complete search history.

(56) References Cited

U.S. PATENT DOCUMENTS

| | | | |
|---|---|---|---|
| 2004/0012753 A1* | 1/2004 | Udaka et al. | 349/187 |
| 2006/0023111 A1* | 2/2006 | DeMenthon | 348/360 |
| 2007/0182815 A1* | 8/2007 | DiFrancesco | 348/97 |
| 2007/0242201 A1* | 10/2007 | Hyatt | 349/123 |
| 2007/0280669 A1* | 12/2007 | Karim | 396/155 |
| 2009/0122170 A1* | 5/2009 | Miyashita et al. | 348/294 |
| 2009/0244355 A1* | 10/2009 | Horie | 348/340 |
| 2009/0288754 A1* | 11/2009 | Kobayashi et al. | 156/64 |
| 2009/0322970 A1* | 12/2009 | Iwane | 349/1 |
| 2010/0026870 A1* | 2/2010 | Sakemoto | 348/333.01 |
| 2010/0045847 A1* | 2/2010 | Ryu | 348/341 |
| 2011/0076005 A1* | 3/2011 | Guo | 396/457 |
| 2012/0075513 A1* | 3/2012 | Chipman et al. | 348/302 |
| 2014/0055664 A1* | 2/2014 | Yamagata et al. | 348/360 |

* cited by examiner

*Primary Examiner* — Roberto Velez
*Assistant Examiner* — Abdelaaziz Tissire
(74) *Attorney, Agent, or Firm* — Novak Druce Connolly Bove + Quigg LLP (57) ABSTRACT

A polarization device can comprise a layer of liquid crystal material and a polarizing layer. The layer of liquid crystal material can be sandwiched between two layers of electrodes. A voltage can be applied across the two layers of electrodes to the layer of liquid crystal material. The voltage can cause the orientation of liquid crystals to change. The direction of polarization of light passing through the layer of liquid crystal material must conform to the orientation of the liquid crystals. As such, the direction of the polarization of light passing through the polarization device (comprising the two electrodes layers sandwiching the liquid crystal material, and the polarizing layer) can be manipulated by altering the voltage applied. Manipulating the polarization of light passing through the polarization device, before the light is received by an image sensor of a camera, can improve image quality in photographs captured by the camera.

25 Claims, 9 Drawing Sheets

ORIENTATION VARIABLE POLARIZATION

BACKGROUND

Cameras are commonly used by all kinds of people. Professional photographers, serious amateur photographers, and casual users all use different kinds of cameras to capture images of different things. A professional photographer or even a serious amateur photographer may use single-lens reflex (SLR) cameras to capture images of nature, the sky, the ocean, the city, and various other subjects. A casual photographer may often use a camera on his/her computing device to take pictures of people, pets, food, points of interest, or other objects. An important aspect of photography relates to the reflection of light. Natural light, such as light from the sky, can be intrinsically polarized. When the light is reflected from objects, such as water, windows, metal, or even plants, the light is polarized at least to some degree and sometimes causes undesired reflections. Two important components of light are the specular reflective component, which is polarized and relates to the shine of an object reflected by light, and the diffuse component, which is not polarized but contains color information of an object reflected by light. Reducing the specular reflective component of light can increase color saturation in captured images. Professional and serious amateur photographers often use externally attached peripheral accessories to adjust polarization. However, casual photographers might not have access to such accessories and might not know how to use them, which can reduce the overall user experience associated with using their cameras.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to polarizing light. In particular, various embodiments of the present disclosure can provide an approach to polarizing an image based at least in part on varying an orientation of a polarization device.

Two important components of light are the specular reflective component and the diffuse component. The specular reflective component is polarized and relates to the shine of an object reflected by light. The diffuse component is not polarized but contains color information of an object reflected by light. Reducing the specular reflective component of light while maintaining the diffuse component can increase color saturation in photographs, making colors look deeper and richer. This can be achieved by adjusting the polarization associated with the light entering the lens and the image sensor of a camera.

At least some embodiments enable a camera to receive light passing through a polarization device (i.e., polarizing device, polarizer) before entering into the image sensor of the camera. The polarization device can comprise a layer of liquid crystal material and a polarizing layer. In exemplary embodiments, the layer of liquid crystal material can be located in between two layers of electrodes. The layer of liquid crystal material can contain a plurality of liquid crystals, which can have an initial orientation/configuration (i.e., default state). In some embodiments, the liquid crystals can be twisted nematic liquid crystals that are initially in a twisted orientation. When light passes through the polarization device, the light is received at the liquid crystals at their initial orientation of and polarized by the polarizing layer when the light passes through the liquid crystals.

In some embodiments, the camera can be associated with a processor, such as that included with a computing device. The processor (e.g., computing device) can determine an appropriate amount of voltage to apply across the two layers of electrodes with the layer of liquid crystal material in between. The determined amount of voltage applied across the two electrodes layers to the liquid crystal material can cause liquid crystals to align in a particular orientation, changed from their default configuration. By adjusting the amount of voltage applied, the orientation to which the liquid crystals are aligned can also be adjusted. When light passes through the liquid crystals, the light conforms to the orientation to which the liquid crystals are aligned. As such, the direction of polarization of the light can be manipulated by changing the voltage.

In some embodiments, the computing device can automatically determine various voltages to apply to the liquid crystal material causing variations in the polarization of images captured. The computing device can determine which of the images has the best overall image quality (e.g., color saturation, reduced reflection, etc.) by utilizing image processing techniques. Therefore, the computing device can determine the appropriate voltage(s) to apply to configure the polarization of light entering the image sensor of the camera, thereby resulting in photographs with improved image quality.

Figure 1:
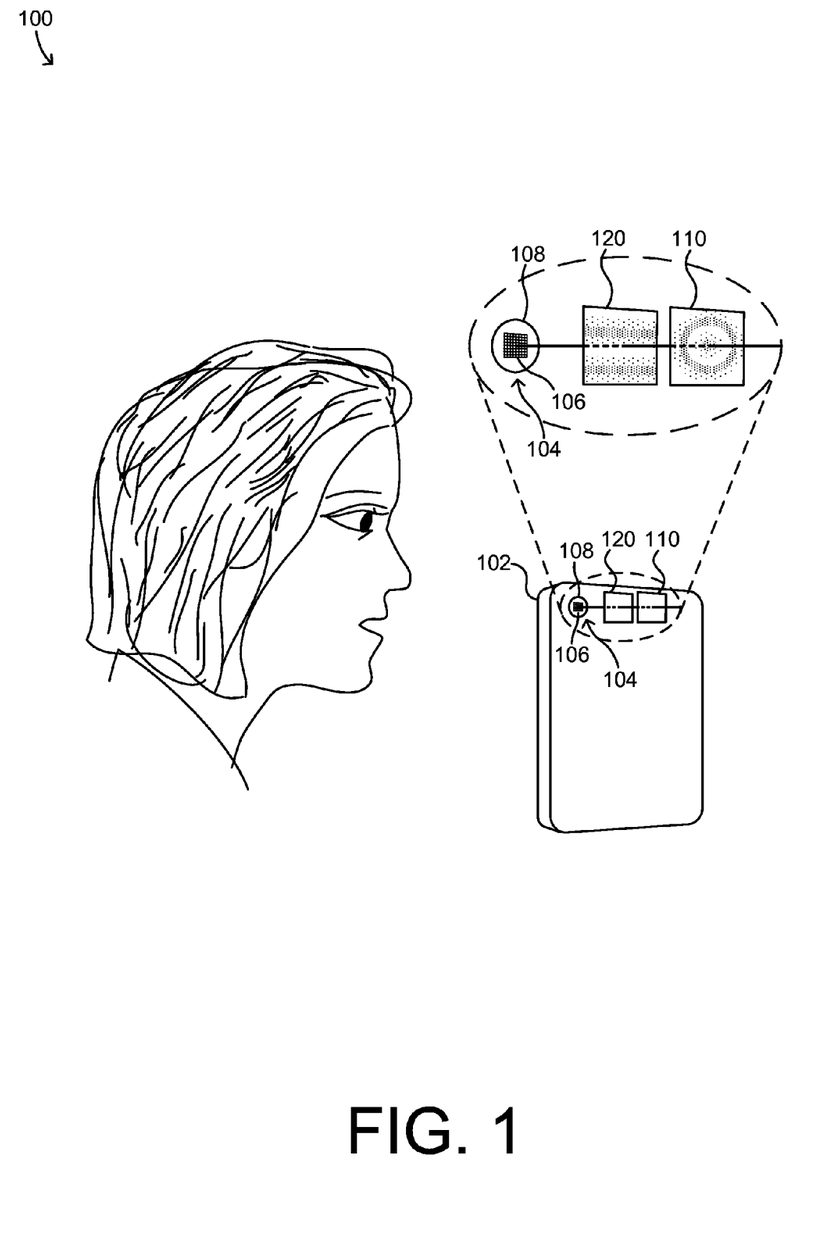
FIG. 1 illustrates an example environment in which aspects of the various embodiments can be utilized.

Various other functions and advantages are described and suggested below as may be provided in accordance with the various embodiments FIG. 1 illustrates an example environment 100 in which aspects of the various embodiments can be utilized. The example environment 100 can comprise a computing device 102, which can include at least one camera 104. A user of the computing device can utilize the at least one camera 104 of the computing device 102 to capture one or more images (e.g., still pictures, video image frames, etc.). In some embodiments, the camera 104 can include an image sensor 106 and a lens 108.

As shown in the example of FIG. 1, in some embodiments, there can be at least two layers (e.g., 110 and 120) in front of the camera image sensor 106 and the camera lens 108. One layer can be a layer of liquid crystals (i.e., sheet of liquid crystals, sheet of liquid crystal material, etc.) 110 and another can be a polarization layer (i.e., sheet polarizer, layer of polarizing material) 120. Liquid crystals can be a state of matter that has properties between those of a conventional liquid and those of a solid crystal. For example, a liquid crystal can flow like a liquid, but its molecules can be oriented in a crystal-like way.

In some embodiments, the layer of liquid crystals (i.e., sheet of liquid crystals, layer of liquid crystal material) 110 can be a layer of twisted nematic liquid crystals. Nematic liquid crystals have fluidity similar to that of ordinary liquids, but nematic liquid crystals can be aligned by an external magnetic or electric field. Twisted nematic liquid crystals can useful in liquid crystal displays (LCDs). In a default/initial position, the nematic liquid crystals can be twisted so that light passing through the twisted nematic liquid crystals will also twist based on the how the nematic liquid crystals are twisted. For example, if the nematic liquid crystals are twisted 90 degrees (e.g., from horizontal gradually to vertical, or vice versa), then light passing through the crystals will be twisted 90 degrees. If the nematic liquid crystals are twisted from a horizontal orientation to a vertical orientation, then light entering the crystals at the horizontal orientation will pass through the crystals to become vertically orientated.

Although not shown in FIG. 1, in some embodiments, the layer of liquid crystals 110 can be sandwiched between two layers of electrodes. When a voltage is applied across the two layers of electrodes, an electromagnetic field can be created. The electromagnetic field created by the applied voltage can cause the twisted nematic liquid crystals change in orientation. For example, the electromagnetic field created by the applied voltage can cause the twisted nematic liquid crystals to become untwisted. When the nematic liquid crystals become untwisted, then any light passing through the crystals will not be twisted either. In other words, if the twisted nematic liquid crystals are aligned by the electromagnetic field to be straight (e.g., untwisted), then the orientation of any light passing through the crystals will not change.

Moreover, the orientation of the nematic liquid crystals (e.g., the amount of twisting/untwisting) can be controlled at least in part by the electromagnetic field created by the applied voltage. In other words, by varying the voltage applied across the two layers of electrodes sandwiching the layer of liquid crystals 110, the orientation of the liquid crystals in the layer of liquid crystals 110 can be varied correspondingly. As the orientation of the liquid crystals in the layer of liquid crystals 110 is varied, the orientation of light passing through the liquid crystals will also vary correspondingly. Therefore, at least in some embodiments, the voltage applied can control the orientation of the light passing through the liquid crystals.

Now turning back to FIG. 1, the other layer can be a polarization layer (i.e., sheet polarizer, layer of polarizing material, etc.) 120. The polarization layer 120 can be an optical filter that passes light of a specific polarization and blocks waves of other polarizations. The polarization layer 120 can convert a light beam having an undefined or mixed polarization into a light beam with defined polarization.

In some embodiments, the polarization layer 120 can be a linear polarizer (e.g., horizontal polarizer, vertical polarizer, etc.). As shown in FIG. 1, the polarization layer 120 can be a vertical polarizer, which receives light passing through the liquid crystals. Although the polarization layer 120 is shown in FIG. 1 to have horizontal linear details, the horizontal linear details represent the mechanisms (e.g., a horizontal bar of conductive polarizing elements) for a vertical polarization layer 120. Also, the polarization layer 120 is shown to be a vertical polarizer in the example of FIG. 1, but this is for illustrative purposes only and it is contemplated that the polarization layer 120 can be a polarizer that linearly polarizes in any direction. For example, the polarization layer 120 can be a horizontal polarizer (not shown in FIG. 1).

Accordingly, the layer of liquid crystals 110 and the polarization layer 120 can work in conjunction to control the direction of the polarization for light entering the image sensor 106 of the camera. By adjusting a voltage across the two layers of electrodes sandwiching the liquid crystals layer 110, the direction of the polarization for light exiting the layer of liquid crystals 110 can be manipulated.

In some embodiments, multiple images or image portions (e.g., sampling images or image portions) can be taken with various polarizations, by varying the voltage applied across the two electrode layers. Image processing can be utilized to determine which of the multiple images/image portions (e.g., sampling images/image portions) has the best image quality (e.g., best polarization, best color saturation, best reflection reduction, best contrast, etc.). Then the "real" (non-sampling) image can be taken at the appropriate voltage associated with the best sampling image/portion. In some embodiments, the taking of the multiple images/portions (e.g., the sampling process) can occur in conjunction with an autofocus process of the camera.

Figure 2A:
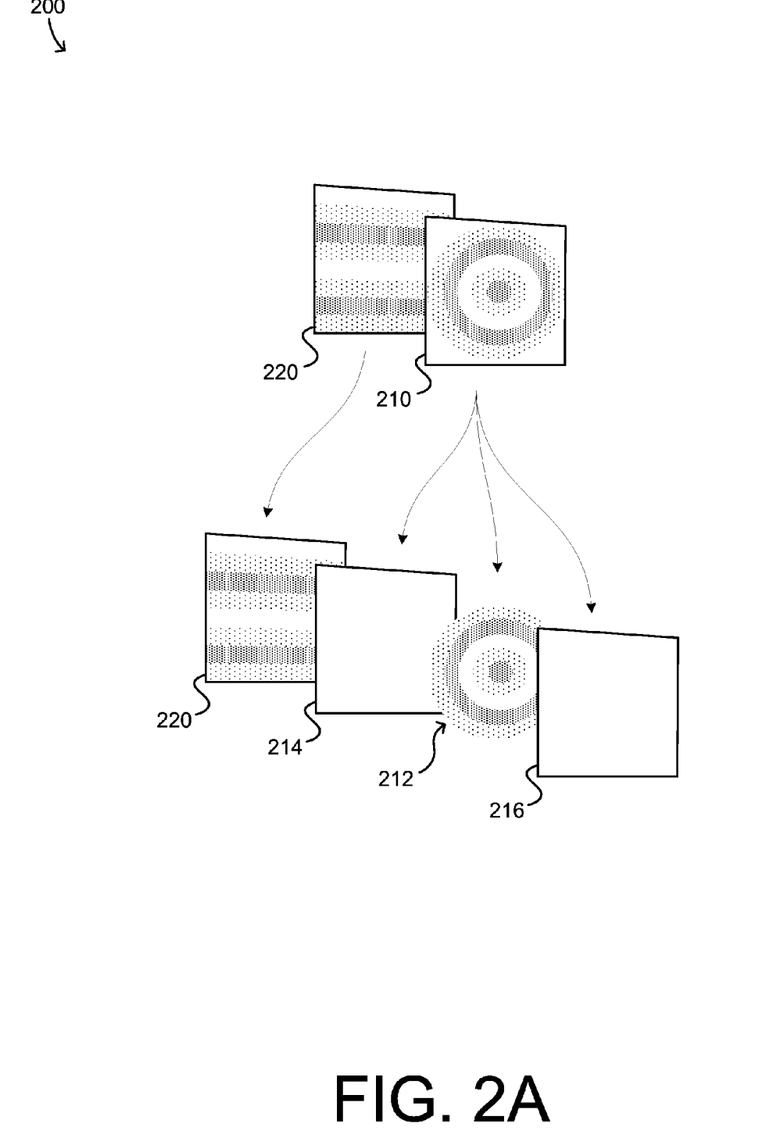
FIG. 2A illustrates an example device embodiment for orientation variable polarization.
Figure 2B:
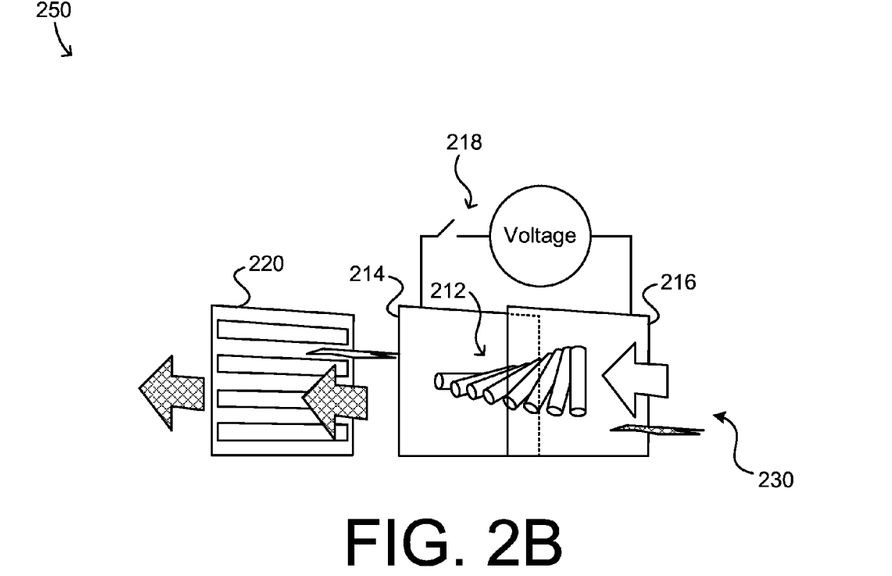
FIG. 2B illustrates an example device embodiment for orientation variable polarization.
Figure 2C:
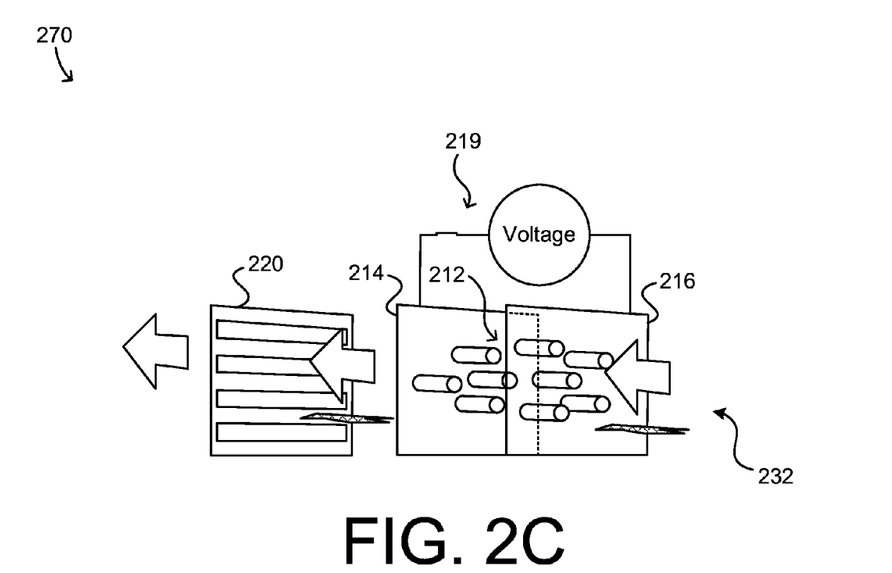
FIG. 2C illustrates an example device embodiment for orientation variable polarization.

FIG. 2A, FIG. 2B, and FIG. 2C each illustrates an example device embodiment for orientation variable polarization. FIG. 2A, FIG. 2B, and FIG. 2C each illustrates in more detail an example device embodiment comprising the layer of liquid crystals (i.e., sheet of liquid crystals) 210 and the polarization layer (i.e., polarization sheet) 220.

As mentioned previously, the layer of liquid crystals 210 comprised in the example device 200 can be further broken down. As shown in FIG. 2A, the layer of liquid crystals 210 can include a plurality of liquid crystals 212 and two layers of electrodes, 214 and 216. The two layers of electrodes, 214 and 216, can sandwich the plurality of liquid crystals 212 such that the plurality of liquid crystals 212 is in between the electrodes layers, 214 and 216. In some embodiments, the two layers of electrodes (214 and 216) can be transparent. In some embodiments, the electrodes in the two layers (214 and 216) can be Tin-Oxide electrodes, such as Indium Tin-Oxide (ITO) common electrodes.

With reference to FIG. 2B, in some embodiments, the default/initial state (i.e., when no voltage is applied 218) of the plurality of liquid crystals 212 can be such that the crystals 212 are twisted. As such, in the default/initial state of the plurality of liquid crystals 212, any light 230 that enters plurality of liquid crystals 212 can be twisted in orientation corresponding to the twist of the crystals 212.

In one example, light 230 entering the device embodiment 250 can first pass through one electrode layer 216, which can be a transparent common ITO electrode layer. The light can then enter the plurality of liquid crystals 212 that are twisted, due to their default/initial configuration/state. The twist of the crystals causes the light to twist correspondingly. In this example, the crystals have a 90 degree twist (e.g., clockwise, as shown in FIG. 2B). As such, when the light comes out from the crystals, the light has become twisted in orientation by 90 degrees (e.g., clockwise) as it passes through the other electrode layer 214. The light can then be polarized by the polarization layer 220. In this example, the polarization layer 220 can be a vertical polarizer (represented by horizontal conductive polarizing elements as shown in FIG. 2B) such that only light in a vertically polarized direction can pass through the polarization layer 220.

Referring now to FIG. 2C, there can be a specified voltage applied 219 across the two layers of electrodes (214 and 216). In some embodiments, the specified voltage applied 219 can be a threshold voltage (i.e., a voltage that causes a substantially optimal amount of liquid crystals 212 to be aligned/untwisted, thereby allowing a substantially optimal amount of light to pass through the crystals 212). The voltage applied can cause the crystals 212 to move correspondingly, such as for the crystals 212 to move out of their twisted orientation and become aligned in a straight/untwisted manner. Therefore, when light enters the crystals 212 in their straight/untwisted configuration, the light passes straight through the crystals 212 and the light remains in the same orientation.

In one example, as shown in FIG. 2C, light 232 enters the example device 270 and passes through one electrode layer 216 and enters the plurality of liquid crystals 212. Due to the applied voltage 219 creating the electromagnetic field and causing the crystals 212 to become aligned (e.g., straight, untwisted, etc.), the light passes through without changing its orientation(s)/direction(s) of polarization. Then the light exits the crystals 212 and passes through the other electrode layer 214 without changing its orientation(s)/direction(s) of polarization. Next, the light enters the polarization layer 220, which polarizes the light 232 vertically.

Therefore, as illustrated in the examples of FIG. 2B and FIG. 2C, the orientation/direction of polarization of light that passes through the example device (e.g., 200, 250, 270) can be controlled by applying voltage. Moreover, the orientation/direction of polarization of the light can be manipulated by the amount of voltage applied. In some embodiments, the applied voltage can be determined/calculated by a processor to cause the crystals 212 to twist or untwist only partially, thereby changing the orientation/direction of polarization of the light only by an amount corresponding to the partial twist or untwist (i.e., corresponding to the amount of voltage applied). In other words, the relationship between the voltage and the orientation/direction of polarization of the light is not an "all or nothing" relationship. For example, applying a fraction of the threshold voltage can cause the orientation/direction of polarization to change 45 degrees, resulting in a vertically polarized light entering the crystals 212 becoming slanted halfway between vertical and horizontal as the light exits the crystals 212.

Figure 3A:
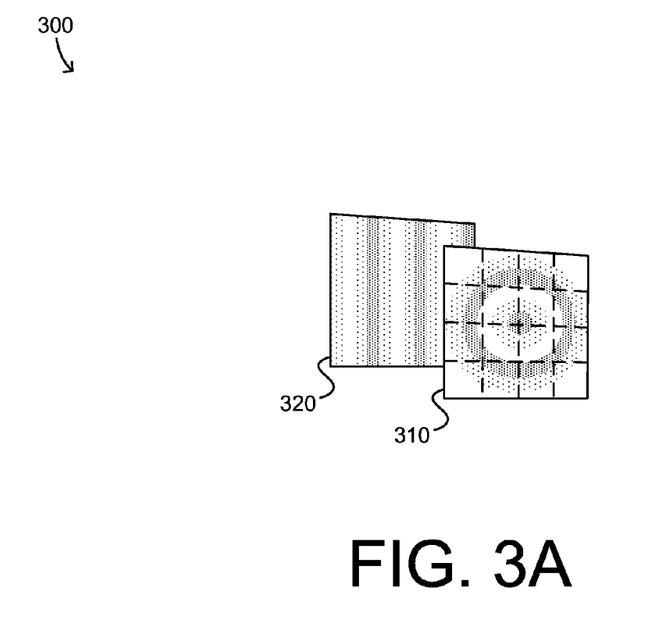
FIG. 3A illustrates an example device embodiment for orientation variable polarization.

FIG. 3A illustrates an example device embodiment 300 for orientation variable polarization. The example device embodiment 300 can comprise a layer of liquid crystal material 310 and a layer of polarizing material 320. As shown in FIG. 3A, the example device 300 can be divided into zones (i.e., pixels). As discussed above, in some embodiments, multiple images/image portions (e.g., sampling images/image portions) can be taken with various polarizations, by varying the voltage applied across the two electrode layers, to determine which of the multiple images/portions (e.g., sampling images/portions) has the best image quality (e.g., best polarization, best color saturation, best reflection reduction, best contrast, etc.). Then the "real" (non-sampling) image can be taken at the same voltage as applied to the best sampling image/portion.

In some embodiments, the process of taking multiple (sampling) images/portions can occur simultaneously using the zones (i.e., pixels) of the liquid crystal. Each of the zones can be used to capture a portion of an image of a view but each portion of the image can have a different polarization. Image processing can be performed on the zones to determine which zone corresponds to the best image quality. For example, an optimal color saturation can be defined by a color saturation image quality threshold. If the image processing determines that a portion of the image associated with a zone has at least met an image quality threshold, then that portion of the image likely has the best or optimal level for that image quality.

In one example, a computing device can create zones for the polarizing device. The computing device can set each zone to a different orientation (e.g., 0 degrees, 15 degrees, 30 degrees, 45 degrees, 60 degrees, 75 degrees, 90 degrees, etc.), which can result in each zone having a different polarization. The computing device can take one (sampling) image shot using all the zones and use image processing to analyze each zone to determine which zone(s) has the best contrast/best color saturation/best image quality (e.g., exceeds an image quality threshold). Then on a second (real, non-sampling) shot, the computing device can set all zones to the orientation/polarization of the zone that had the best contrast/best color sat/best image quality. (If multiple zones had the best image quality, then the computing device can interpolate between the multiple zones for a "best" polarization device orientation and/or a "best" amount of voltage to apply.) Then the second (real, non-sampling) shot will have an overall reduced reflection and improved image quality.

In some embodiments, the zones/pixels can be defined by dividing the two layers of electrodes into multiple pieces. Each piece of electrode in one electrode layer can be paired with a paralleled piece of electrode in the other electrode layer, and the two electrode pieces can sandwich a respective section of the liquid crystal material, thus forming a zone/pixel. In some embodiments, the zone/pixel of the polarization device 300 can be the same size or larger than a pixel of the image sensor of the camera.

Figure 3B:
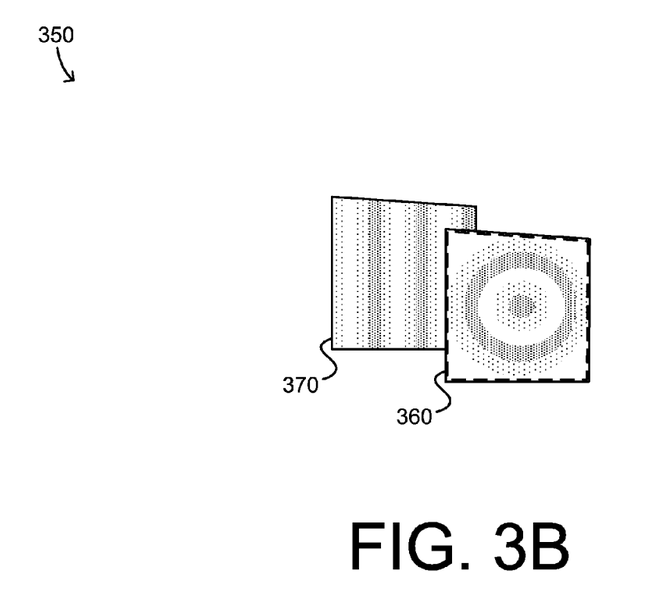
FIG. 3B illustrates an example device embodiment for orientation variable polarization.

FIG. 3B illustrates an example device embodiment 350 for orientation variable polarization. In some embodiments, the polarization device 350 can comprise a single cell/zone/pixel, as shown in FIG. 3B.

In some embodiments, the process of taking multiple (sampling) images/portions can occur sequentially using the single cell/zone/pixel. For example, multiple (sampling) images can be taken sequentially and each image stored (at least temporarily). Image processing can be performed on the stored multiple (sampling images) and determine the "best" sampling image. In some embodiments, this process can occur in conjunction with an autofocus process. Then, when the "real" (non-sampling) image is to be taken, then same voltage as used to take the "best" sampling image can be applied (i.e., the "real" image can be taken at the same polarization direction/crystal orientation as associated with the "best" sampling image).

Figure 4A:
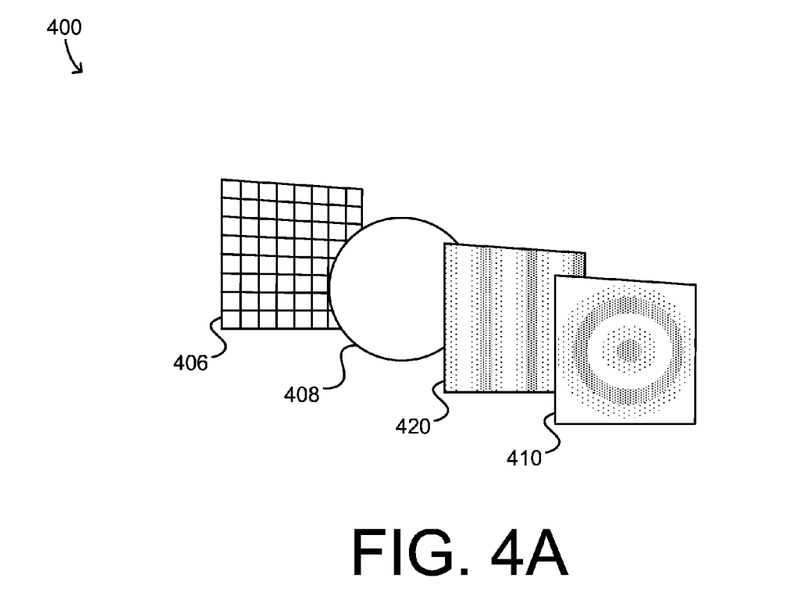
FIG. 4A illustrates an example system embodiment for orientation variable polarization.

FIG. 4A illustrates an example system embodiment 400 for orientation variable polarization. In FIG. 4A (and FIG. 1), the polarization device comprising the layer of liquid crystals 410 and the polarization layer 420 can be located in front of the camera image sensor 406 and the camera lens 408. In some embodiments, the polarization device can be integrated with or can replace a protective covering/window in front of the camera image sensor 406 and lens 408.

Figure 4B:
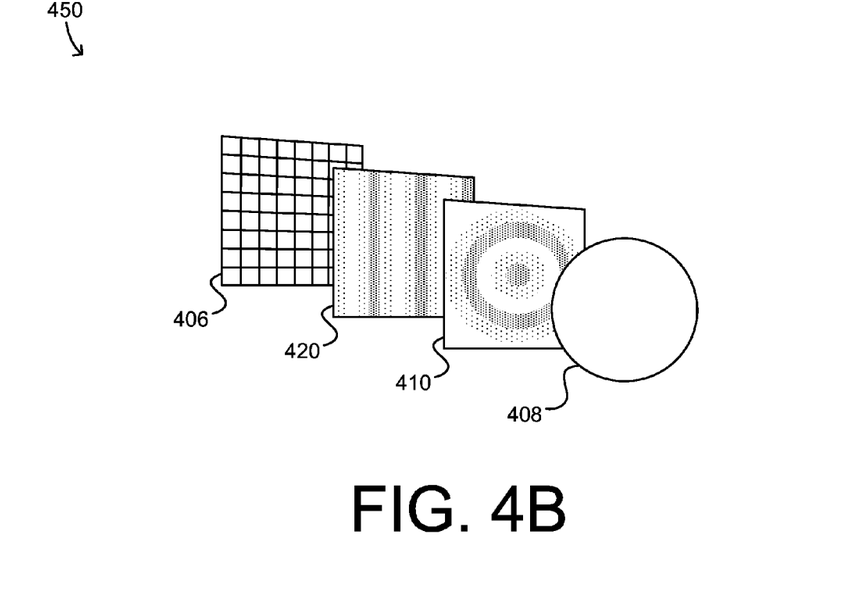
FIG. 4B illustrates an example system embodiment for orientation variable polarization.

FIG. 4B illustrates an example system embodiment 450 for orientation variable polarization. Although in FIG. 4A (and in FIG. 1) the polarization device can be shown to be in front of the camera image sensor 406 and the cameras lens 408, in some embodiments, the polarization device can be in between the camera image sensor 406 and the cameras lens 408.

Figure 5:
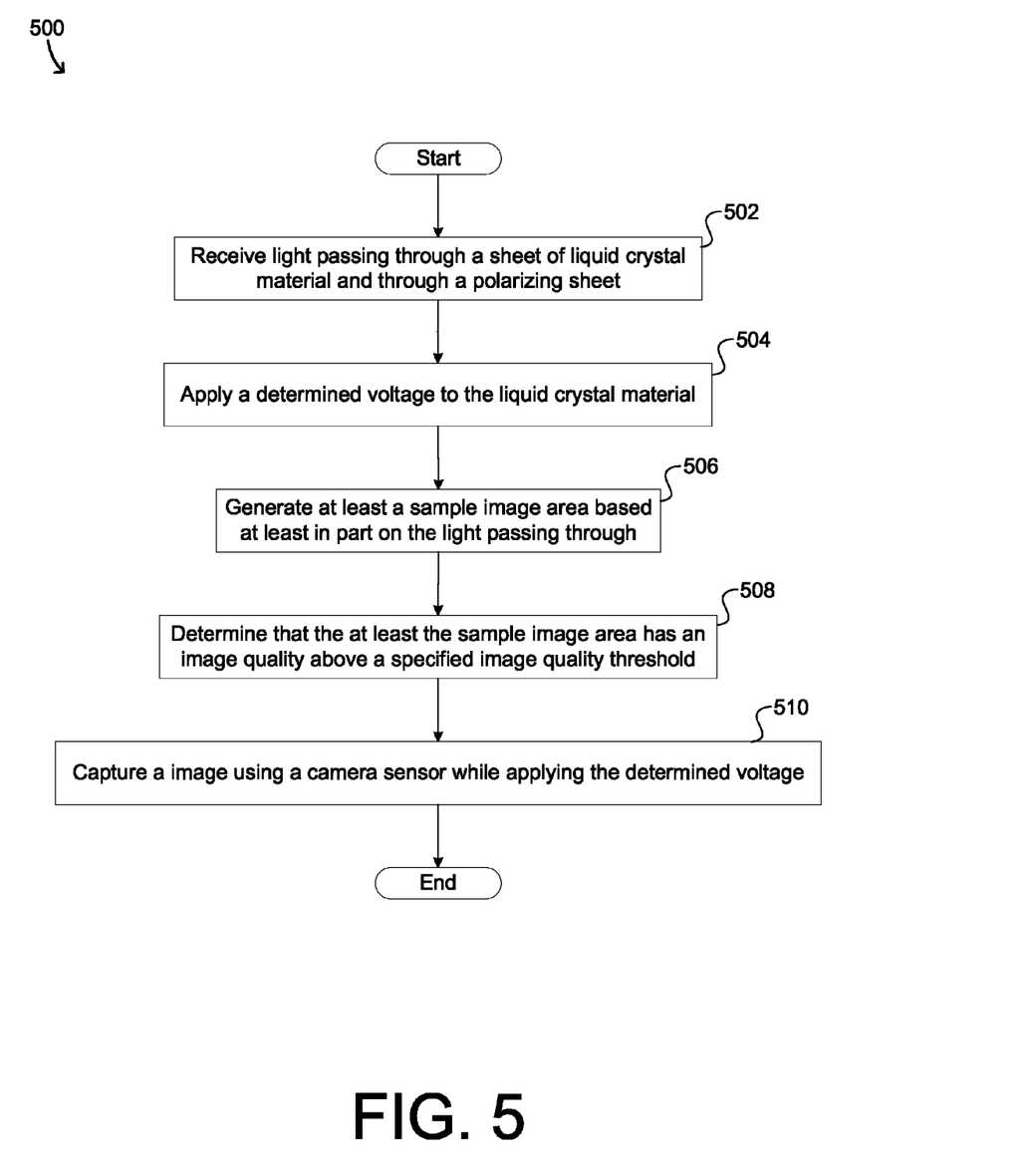
FIG. 5 illustrates an example method embodiment for orientation variable polarization.

FIG. 5 illustrates an example method embodiment 500 for orientation variable polarization. It should be understood that there can be additional, fewer, or alternative steps performed in similar or alternative orders, or in parallel, within the scope of the various embodiments unless otherwise stated. The example method embodiment 500 can start with receiving, to a image sensor (i.e., camera sensor) of a computing device, light passing through a sheet of liquid crystal material and through a polarizing sheet, at step 502. The sheet of liquid crystal material can be located in between two sheets of electrodes. At step 504, the example method 500 can apply a determined voltage across the two sheet of electrodes. The determined voltage can cause at least a portion of the liquid crystal material in the sheet to align to a particular orientation. The portion of the liquid crystal material when aligned to the particular orientation can cause the light to pass through the portion at a direction of polarization corresponding to the particular orientation.

Step 506 can include generating at least a sample image area based at least in part on the light passing through the portion at the direction of polarization. Step 508 can including determining that the at least the sample image area has an image quality above a specified image quality threshold. Then the method 500 can capture an image using the image sensor while applying the determined voltage used to generate the at least the sample image having the image quality above the specified image quality threshold, at step 510.

Figure 6:
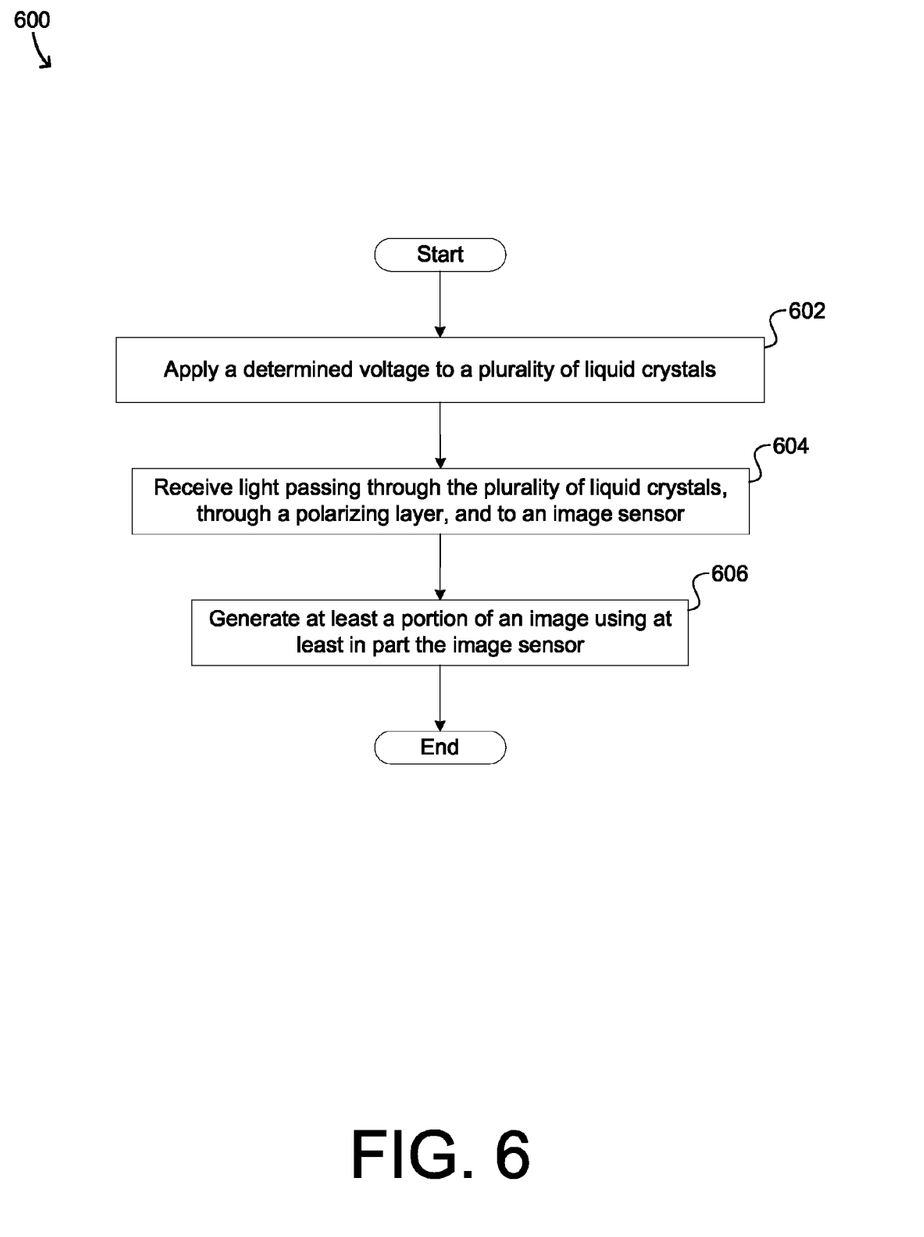
FIG. 6 illustrates an example method embodiment for orientation variable polarization.

FIG. 6 illustrates an example method embodiment 600 for orientation variable polarization. Again, it should be understood that there can be additional, fewer, or alternative steps performed in similar or alternative orders, or in parallel, within the scope of the various embodiments unless otherwise stated. At step 602, the example method embodiment 600 can apply a determined voltage to a plurality of liquid crystals included in a layer of liquid crystal material thereby causing the plurality of liquid crystals to align in a particular orientation. At step 604, the method 600 can receive light passing through the plurality of liquid crystals, through a polarizing layer, and to an image sensor. The plurality of liquid crystals, the polarizing layer, and the image sensor can be associated with a camera of a computing device. Step 606 can include generating at least a portion of an image using at least in part the image sensor. The at least the portion of the image can have a particular polarization based at least in part on the particular orientation in which the plurality of liquid crystals are aligned.

In some embodiments, the various embodiments of the present disclosure can improve the overall look of photographs (e.g., make the sky look a deeper/richer blue color in photographs). Because light associated with the sky is implicitly polarized, if the polarization device is adjusted to polarize orthogonal to that of the sky light, then the blue of the sky will be deeper, richer, and better looking. Moreover, the polarization device can make all colors look more saturated by reducing the specular component of light and maintaining the diffuse component.

In some embodiments, the various embodiments of the present disclosure can reduce reflection for object recognition. For example, if a user takes a picture of a front cover of a book, such as a book to be searched for in an electronic marketplace, then the various embodiments can reduce unwanted reflection (e.g., glare, flare) and increase the likelihood of a successful recognition of the book.

In some embodiments, one or more orientation sensors (e.g., accelerometer, gyroscope, etc.) of a computing device and/or information about the time of day and current geolocation can be utilizing to estimate where the sun is and thus what orientation to set the polarizing device (and/or the zones/pixels of the polarizing device).

In some embodiments, the camera can capture a piecewise polarized image. For example, there can be different areas/portions in the captured image, each of which can have a different polarization.

In some embodiments, the two layers of electrodes can be associated with (e.g., included with) at least one of the lens of the camera, an infrared cut filter, or a protective covering of the image sensor.

In some embodiments, a fifth layer in the form of a quarter wave plate can be added between the image sensor and the electrode layer (e.g., 214) behind the layer of liquid crystal material and behind the polarizing layer. The quarter wave place can receive the linearly polarized light coming out from the previous layers (e.g., electrode layer 214, liquid crystal material 212, electrode layer 216, polarizing layer 220) and can make the linearly polarized light into a circularly polarized light. This can reduce issues with sensitivity to a particular (linear) polarization and can allow the lens or any imaging devices or filters (e.g., infra-red blocking filter) to operate on circularly polarized light.

In some embodiments, if the corners of an image darken due to being captured with a wide angle camera, each electrode further away from a center axis can be offset. In some embodiments, to accommodate a chief ray angle of the lens, an orientation associated with a subset of electrodes in the two layers of electrodes can be offset.

In some embodiments, polarization can be utilized to infer/determine contours of objects in a field of view. In one example, in an image with a round pole, regular image processing cannot determine with high confidence whether the pole is a round pole or a square/rectangular pole. However, by adjusting polarization, image processing can be able to obtain three-dimensional (3D) information, for example, from the shading in polarized light that can help image processing distinguish between a round or a flat (rectangle, square) surface. As such, in some embodiments, by varying the polarization deliberately and methodically, the contours of objects/subjects in a photograph can be inferred/determined.

Various embodiments consistent with the present disclosure can also be implemented to work in conjunction with a server in a network environment. In some embodiments, at least some of the processing or calculations associated with the various embodiments of the present disclosure can be performed by a server in a network environment. For example, image processing can be performed by a network server and the results can be transmitted back from the network server.

Figure 7:
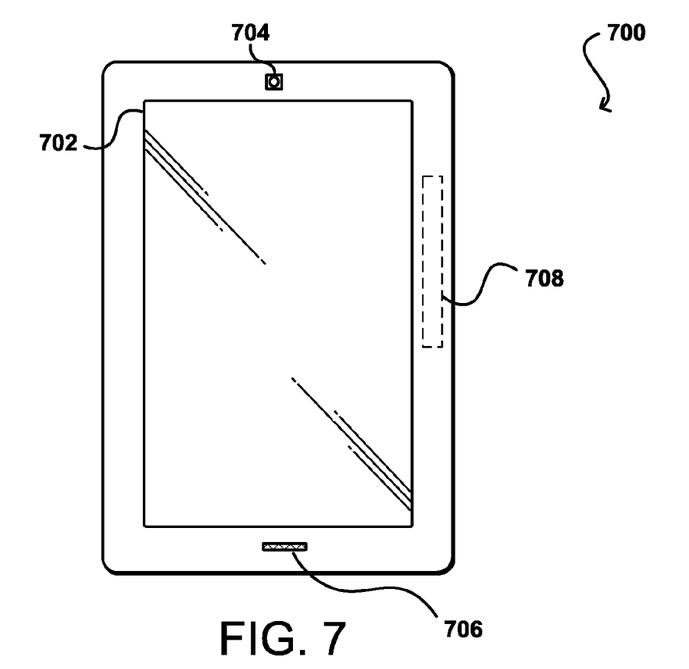
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, cameras (e.g., digital cameras, point-and-shoot cameras, digital single-lens reflex (DSLR) cameras, etc.), and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
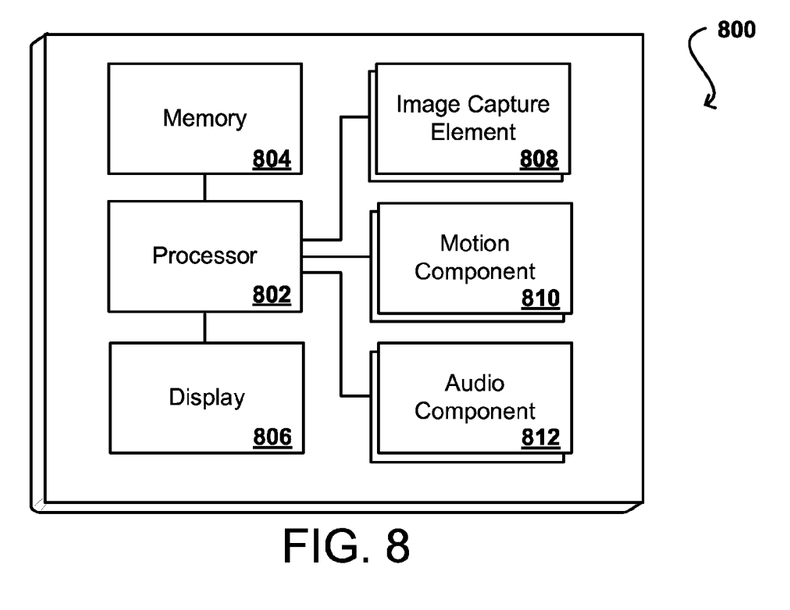
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
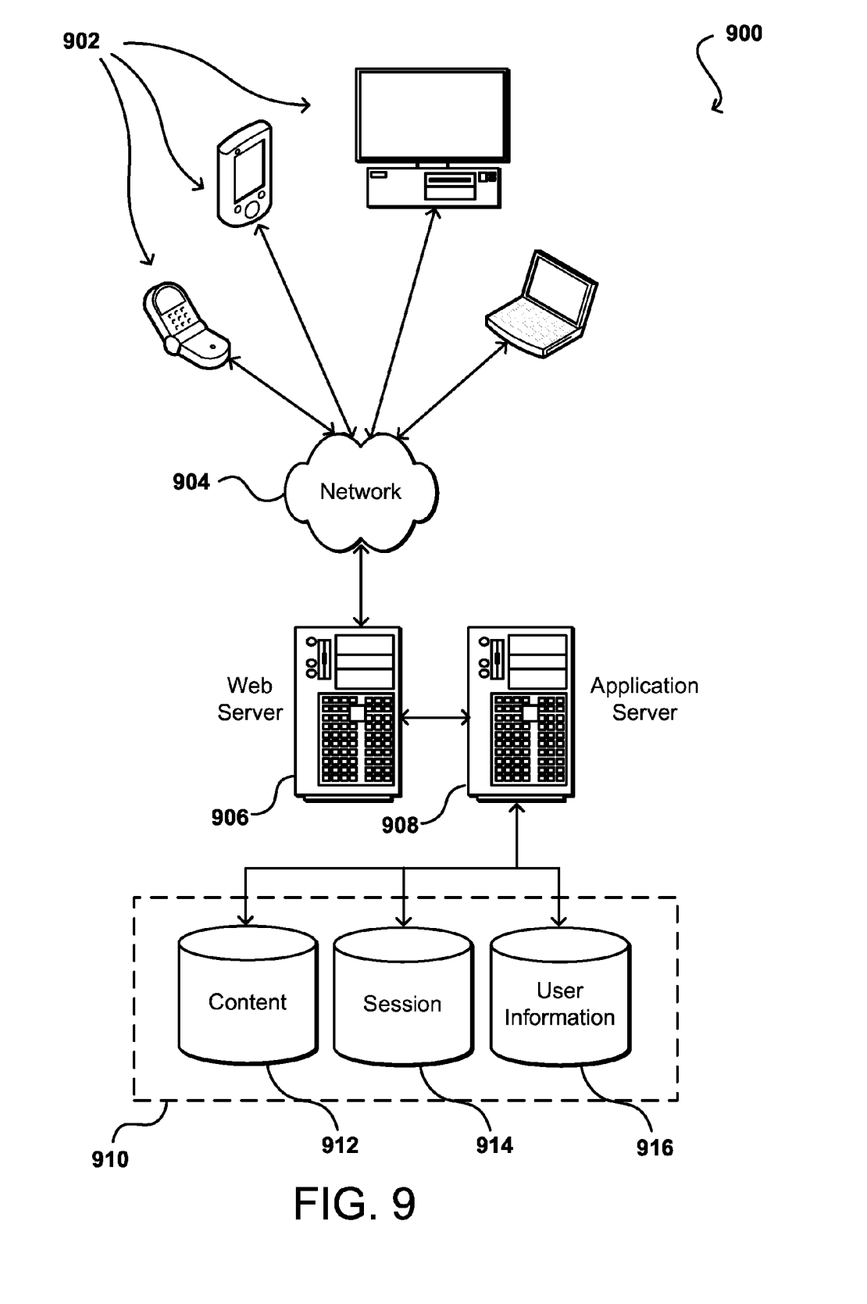
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for implementing a polarizer with variable orientation, comprising:
    receiving, at an image sensor of a computing device, light that has at least in part passed through a layer comprising liquid crystal material;
    applying a voltage in association with the layer comprising liquid crystal material, the voltage causing at least a portion of the liquid crystal material in the layer to align to a particular orientation, the portion of the liquid crystal material when aligned to the particular orientation causing the light to at least partially change in orientation in relation to the image sensor;
    generating a sample image based at least in part on the light at least partially changed in orientation in relation to the image sensor;
    determining that the sample image has an image quality above a threshold; and
    capturing an image using the image sensor while applying the voltage in association with the layer comprising liquid crystal material.

2. The computer-implemented method of claim 1, wherein the generating the sample image and the determining that the sample image having the image quality above the threshold occur during an autofocus process associated with the image sensor of the computing device.

3. A computer-implemented method comprising:
    applying a voltage to a plurality of liquid crystals included in a layer of liquid crystal material thereby causing at least a portion of the plurality of liquid crystals to have a particular orientation;
    receiving, at an image sensor, light that has passed through at least the portion of the plurality of liquid crystals, the portion of the liquid crystals causing the light to at least partially change in orientation in relation to the image sensor;
    generating a sample image based at least in part on the light;
    determining that the sample image has an image quality above a threshold; and
    generating an image using, at least in part, the light received at the image sensor while applying the voltage in association with the layer of liquid crystal material.

4. The computer-implemented method of claim 3, wherein the layer of liquid crystal material is located in between two layers of electrodes and wherein the applying the voltage to the plurality of liquid crystals includes applying the voltage across the two layers of electrodes.

5. The computer-implemented method of claim 4, further comprising:

offsetting an orientation associated with a subset of electrodes in the two layers of electrodes thereby accommodating a chief ray angle of the lens.

6. The computer-implemented method of claim 4, wherein the two layers of electrodes and the layer of liquid crystal material located in between the two layers of electrodes form a single zone through which the light has passed.

7. The computer-implemented method of claim 4, wherein the two layers of electrodes are each divided into a plurality of electrode pieces, each electrode piece in a first layer of electrodes and a paralleled electrode piece in a second layer of electrodes sandwiching a respective portion of the plurality of liquid crystals to form a plurality of zones through which the light has passed.

8. The computer-implemented method of claim 7, wherein the applying the voltage to the plurality of liquid crystals includes applying a respective voltage to each of the plurality of zones, thereby causing the respective portion of the plurality of liquid crystals forming each of the plurality of zones to have a respective orientation based at least in part on the respective voltage.

9. The computer-implemented method of claim 8, wherein the generating the image includes generating a plurality of image portions, wherein the each image portion corresponds to one of the plurality of zones, and wherein each image portion is associated with a respective polarization based at least in part on the respective orientation of the respective portion of the plurality of liquid crystals.

10. The computer-implemented method of claim 9, further comprising:
comparing the plurality of image portions based at least in part on an image quality associated with each image portion;
determining at least one image portion that is associated with an optimal image quality; and
capturing an image using at least in part the image sensor while applying the voltage used in generating the at least one image portion associated with the optimal image quality.

11. The computer-implemented method of claim 3, wherein the image generated using, at least in part, the light received at the image sensor improves at least one image quality associated with the image, and wherein improving the at least one image quality includes at least one of reducing a reflection associated with the image or increasing a color saturation associated with the image.

12. The computer-implemented method of claim 3, further comprising:
converting the light that has passed through the at least the portion of the plurality of liquid crystals into a circularly polarized light using at least in part a quarter wave plate.

13. The computer-implemented method of claim 3, further comprising:
determining a contour of an object included in the image, the determining the contour of the object being based at least in part on analyzing the image generated using, at least in part, the light received at the image sensor.

14. A system comprising:
a camera including an image sensor;
a layer of liquid crystal material located in front of the image sensor; and
at least two voltage contact points, a first voltage contact point associated with a front surface of the layer of liquid crystal material and a second voltage contact point associated with a back surface of the layer of liquid crystal material, the at least two voltage contact points configured to accept an applied voltage causing at least a subset of liquid crystals included in the layer of liquid crystal material to have a particular orientation, and
wherein a sample image is generated based at least in part on light that has passed through the at least the subset of liquid crystals and is captured using the image sensor,
wherein the sample image is determined to have an image quality above a threshold, and
wherein light that has passed through the at least the subset of liquid crystals is captured using the image sensor of the camera, while applying the applied voltage in association with the layer of liquid crystal material, to form an image associated with a polarization based at least in part on the particular orientation of the at least the subset of liquid crystals.

15. The system of claim 14, further comprising:
a polarizing layer located in between the image sensor and the layer of liquid crystal material, the polarizing layer configured to linearly polarize light that has passed through the layer of liquid crystal material to be received at the image sensor.

16. The system of claim 14, further comprising:
two layers of electrodes sandwiching the layer of liquid crystal material, wherein the first voltage contact point is included in a first layer of electrodes and the second voltage contact point is included in a second layer of electrodes.

17. The system of claim 14, further comprising:
a quarter wave plate configured to convert the light that has passed through the at least the subset of liquid crystals into a circularly polarized light.

18. A system comprising:
a camera including an image sensor and a lens;
a polarizing layer located in front of the image sensor;
a layer of liquid crystal material located in between two layers of electrodes, the two layers of electrodes located in front of the polarizing layer;
a processor; and
a memory device including instructions that, when executed by the processor, cause the system to:
apply a voltage to a plurality of liquid crystals included in the layer of liquid crystal material thereby causing at least a portion of the plurality of liquid crystals to have a particular orientation;
receive, at the image sensor, light that has passed through at least the first portion of the plurality of liquid crystals, the portion of the liquid crystals causing the light to at least partially change in orientation in relation to the image sensor;
generate a sample image based at least in part on the light;
determine that the sample image has an image quality above a threshold; and
generate an image using, at least in part, the light received at the image sensor while applying the voltage in association with the layer of liquid crystal material.

19. The system of claim 18, wherein the lens included in the camera is located behind the polarizing layer, the layer of liquid crystal material, and the two layers of electrodes, but in front of the image sensor.

20. The system of claim 19, wherein the polarizing layer, the layer of liquid crystal material, and the two layers of electrodes are associated with a cover for protecting the camera.

21. The system of claim 18, wherein the lens included in the camera is located in front of the polarizing layer, the layer of liquid crystal material, the two layers of electrodes, and the image sensor.

22. The system of claim 18, wherein the two layers of electrodes are associated with at least one of the lens, an infrared cut filter, or a protective covering of the image sensor.

23. A non-transitory computer-readable storage medium including instructions for identifying elements, the instructions when executed by a processor of a system causing the system to:

apply a voltage to a plurality of liquid crystals included in a layer of liquid crystal material thereby causing at least a portion of the plurality of liquid crystals to have a particular orientation;

receive, at an image sensor of the system, light that has passed through at least the first portion of the plurality of liquid crystals, the portion of the liquid crystals causing the light to at least partially change in orientation in relation to the image sensor;

generate a sample image based at least in part on the light;

determine that the sample image has an image quality above a threshold; and generate an image using, at least in part, the light received at the image sensor while applying the voltage in association with the layer of liquid crystal material.

24. The non-transitory computer-readable storage medium of claim 23, wherein the layer of liquid crystal material is located in between two layers of electrodes and wherein the applying the voltage to the plurality of liquid crystals includes applying the voltage across the two layers of electrodes.

25. The non-transitory computer-readable storage medium of claim 23, wherein the instructions cause the system to further modify the voltage thereby causing the at least the portion of the plurality of liquid crystals to have a different orientation and the image to be associated with a different polarization based at least in part on the different orientation of the portion of the plurality of liquid crystals.

\* \* \* \* \*